(12) United States Patent
Chen et al.

(10) Patent No.: US 8,107,754 B2
(45) Date of Patent: Jan. 31, 2012

(54) SYSTEMS AND METHODS FOR RANDOMLY ACCESSING COMPRESSED IMAGES

(75) Inventors: Cheng-Che Chen, Taipei County (TW); Ching-Hua Wen, Taoyuan Hsien (TW); Chan-Hung Su, Kaohsiung (TW)

(73) Assignee: MediaTek Inc., Hsin-Chu (TW)

( * ) Notice: Subject to any disclaimer, the term of this patent is extended or adjusted under 35 U.S.C. 154(b) by 1088 days.

(21) Appl. No.: 11/952,458

(22) Filed: Dec. 7, 2007

(65) Prior Publication Data

US 2009/0148057 A1    Jun. 11, 2009

(51) Int. Cl.
*G06K 9/36* (2006.01)
*G06K 9/46* (2006.01)

(52) U.S. Cl. ........................ 382/243; 382/251

(58) Field of Classification Search .................. 382/232, 382/233, 239, 243, 246, 250, 251; 358/261.4, 358/432, 433, 452, 453; 348/415.1, 416.1, 348/581; 375/240.01, 240.13, 240.16, 240.24, 375/240.25; 386/68, 111, 112; 345/434, 345/437–439; 707/101–104; 341/55, 106; 725/147

See application file for complete search history.

(56) References Cited

U.S. PATENT DOCUMENTS

| | | | | |
|---|---|---|---|---|
| 5,003,307 A * | 3/1991 | Whiting et al. | ................ | 341/51 |
| 5,155,484 A * | 10/1992 | Chambers, IV | ................ | 341/55 |
| 6,091,853 A * | 7/2000 | Otto | ............................ | 382/232 |
| 6,167,083 A * | 12/2000 | Sporer et al. | ............. | 375/240.01 |
| 6,240,419 B1 * | 5/2001 | Franaszek | ..................... | 707/693 |
| 6,381,371 B1 | 4/2002 | Epstein et al. | | |
| 6,947,598 B2 * | 9/2005 | Yogeshwar et al. | .......... | 382/232 |
| 7,212,726 B2 * | 5/2007 | Zetts | ........................... | 386/329 |
| 7,593,465 B2 * | 9/2009 | Jia et al. | ................... | 375/240.25 |
| 7,756,817 B2 * | 7/2010 | Merchia et al. | ........................ | 1/1 |
| 2001/0024472 A1 * | 9/2001 | Sporer et al. | ............. | 375/240.16 |
| 2007/0081730 A1 | 4/2007 | Arakawa et al. | | |
| 2009/0100496 A1 * | 4/2009 | Bechtolsheim et al. | ....... | 725/147 |
| 2009/0148057 A1 * | 6/2009 | Chen et al. | ..................... | 382/243 |

FOREIGN PATENT DOCUMENTS

WO  WO2005050567  6/2005

OTHER PUBLICATIONS

German Office Action mailed Oct. 22, 2008.
Strutz, T.: Bilddatenkompression-Grundlagen, Codierung, Wavelets, JPEG, MPEG, H.264 Vieweg Verlag, 3rd Edition May 2005, p. VII, p. 153, p. 159-166, p. 171-178. Partial English translation of Strutz, T.: Bilddatenkompression-Grundlagen, Codierung, Wavelets, JPEG, MPEG, H.264 Vieweg Verlag, 3rd Edition May 2005, p. VII, p. 153, p. 159-166, p. 171-178.
English translation of diagrams for Strutz, T: Bilddatenkompression-Grundlagen, Codierung, Wavelets, JPEG, MPEG, H.264 Vieweg Verlag, 3rd Edition May 2005, p. VII, p. 153, p. 159-166, p. 171-178.
Berc, L; FEnner, W.; Frederick, R. et al.: RTP Payload Format for JPEG-compressed Video. RFC 2035, Network Working Group, Oct. 1996, p. 1-16.

* cited by examiner

*Primary Examiner* — Amir Alavi
(74) *Attorney, Agent, or Firm* — Thomas|Kayden

(57) ABSTRACT

An embodiment of a method for encoding a source image comprising multiple data units, performed by an image encoding unit, comprises the following steps. A quantized DC coefficient and multiple AC coefficients of a data unit are generated. A value at the (0,0) element of the first data unit is determined according to the quantized DC coefficient. A variable length coding (VLC) stream of the data unit is generated by encoding the determined value and the AC coefficients. An encoded bitstream comprising a restart mark followed by the VLC stream of the data unit is generated. An offset pointing to the beginning of the restart mark of the encoded bitstream is stored in a random access table. A compression image comprising the encoded bitstream and the random access table is generated.

27 Claims, 20 Drawing Sheets

(8 X 8)

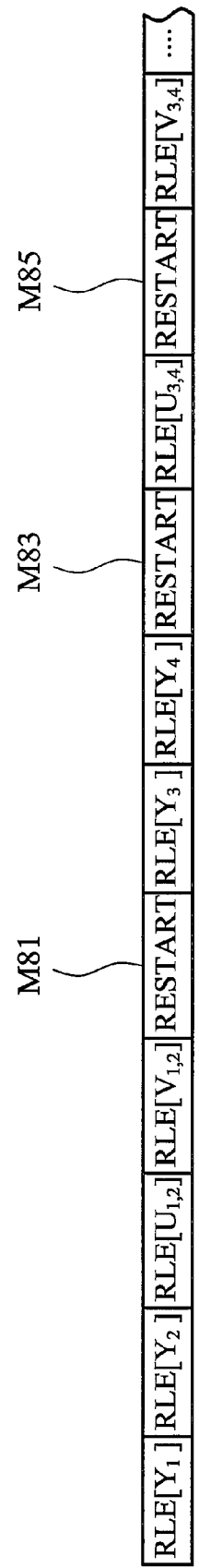

FIG. 9

| size | length of code word | code word |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

SYSTEMS AND METHODS FOR RANDOMLY ACCESSING COMPRESSED IMAGES

BACKGROUND

The invention relates to image encoding and decoding, and more particularly, to systems and methods for randomly accessing compressed images.

When viewing an image, a user may prefer to zoom-in a particular portion of the image for detailed viewing. When a user selects the particular portion of an image, an image decoding method fully decodes the entire image and displays the selected portion of the image on a screen. Decoding non-displayed portions of an image using this image decoding method, however, may be excessively time consuming. Systems and methods for encoding and decoding compression images with random access capability are required.

SUMMARY

Systems and methods for encoding source images are provided. An embodiment of a method for encoding a source image comprising multiple data units, performed by an image encoding unit, comprises the following steps. A quantized DC coefficient and multiple AC coefficients of a data unit are generated. A value at the (0,0) element of the first data unit is determined according to the quantized DC coefficient. A variable length coding (VLC) stream of the data unit is generated by encoding the determined value and the AC coefficients. An encoded bitstream comprising a restart mark followed by the VLC stream of the data unit is generated. An offset pointing to the beginning of the restart mark of the encoded bitstream is stored in a random access table. A compression image comprising the encoded bitstream and the random access table is generated. An embodiment of a system for encoding a source image using the described embodiment of method is also disclosed.

Systems and methods for decoding compression images are provided. An embodiment of a method for decoding a compression image comprising an encoded bitstream and a random access table, performed by an image decoding unit, comprises the following steps. The random access table comprising multiple offsets is acquired from the compression image. One offset corresponding to a portion of the encoded bitstream to be decoded is found. The encoded bitstream after the found offset is decoded. The decoding results are displayed. An embodiment of a system for decoding a compression image using the described embodiment of method is also disclosed.

BRIEF DESCRIPTION OF THE DRAWINGS

The present invention can be more fully understood by reading the subsequent detailed description and examples with references made to the accompanying drawings, wherein:

FIG. 8a illustrates an exemplary RLE stream containing no restart marks corresponding to FIG. 7a;

FIG. 8b illustrates an exemplary RLE stream containing three restart marks corresponding to FIG. 7b;

FIG. 9 is a diagram of an exemplary alignment in a zig-zag order.

FIGS. 10a and 10b are diagrams of exemplary luminance DC difference mapping and luminance AC coefficient mapping tables;

DETAILED DESCRIPTION

An image processing system for randomly accessing compression images is disclosed. The system is typically composed of an encoder and a decoder. It should be noted that the encoder and decoder may be practiced in a single electronic device/apparatus or different electronic devices/apparatuses.

Figure 1:
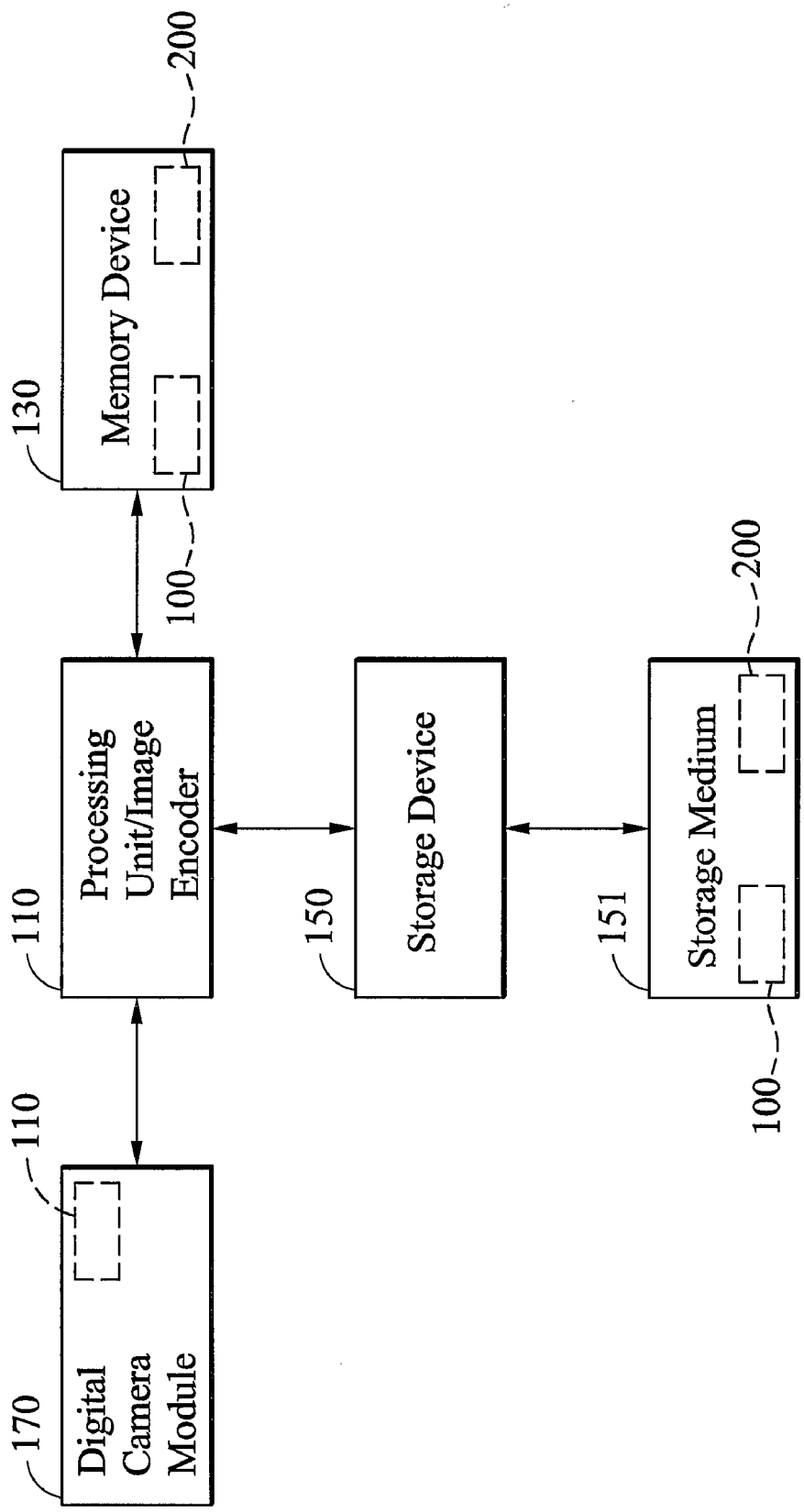
FIG. 1 is a diagram of a hardware environment applicable to an embodiment of an electronic device.

Methods for generating compressed images comprising random access information, employed in electronic devices such as digital cameras, mobile phones and personal digital assistants (PDAs) with/without digital camera modules, and the like, are provided. FIG. 1 is a diagram of a hardware environment applicable to an embodiment of an electronic device comprising a processing unit/image encoder 110 (also referred to as an image encoding unit), a memory device 130, a storage device 150, and a digital camera module 170. A source image 100 may be acquired by the digital camera module, or may be stored in the memory device 130 such as dynamic random access memory (DRAM), synchronous DRAM (SDRAM), flash memory device or similar, or a storage medium 151 such as a compact flash (CF), memory stick (MS), smart media (SM), or SD memory card or similar, loaded by the storage device 150. The digital camera module 170 contains an image sensor module comprising multiple charge couple device (CCD) image sensors, complementary metal oxide semiconductor (CMOS) image sensors or similar to record the intensity of light as variable charges. In order to convert the content of the image sensor module to a digital format, an image signal processor (ISP) of the digital camera module 170 quantifies the variable charge into a discrete number of colors to generate the source image 100. The source image 100 contains numerous pixel data (typically containing R, G, B components) quantified by the ISP 311 in a given resolution such as 640×480, 1024×768 and so on. The disclosed digital camera module may not necessarily to be disposed on some embodiments of electronic devices, for example, image transcoders, and the similar. Thus, the source image 100 may be generated and output by another electronic device, and then, the disclosed electronic device receives and stores the output source image 100 in the memory device 130 or the storage medium 151. The processing unit/image encoder 110 generates a compression image 200 by encoding the source image 100 in a compression format such as the Joint Photographic Experts Group (JPEG) format. The compression image 200 may be further stored in the memory device 200 or storage medium 151, or transmitted to another electronic device for remote storage or decoding. During compression for the source image 100, the processing unit/image encoder 110 generates an encoded bitstream comprising multiple restart marks, a random access table recording multiple random access points each represented by an offset of the encoded bitstream, and encapsulates the encoded bitstream with the random access table into the compression image 200. It is to be understood that the compression image 200 is typically stored in a form of file.

Figure 2:
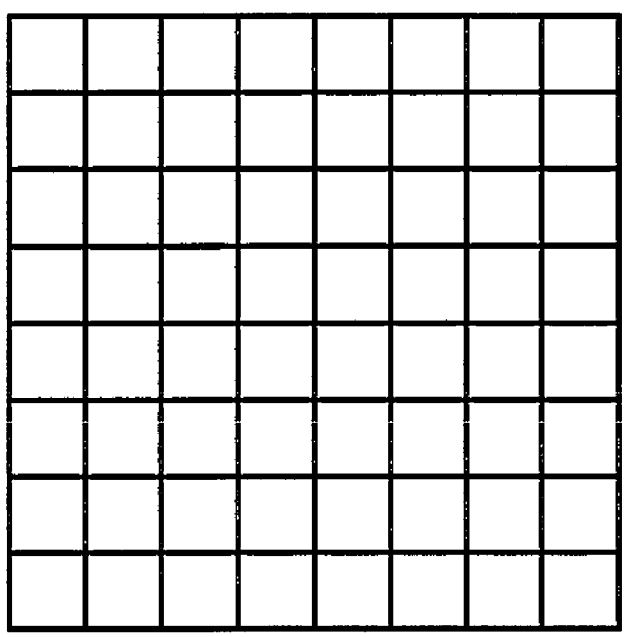
FIG. 2 is a diagram of an exemplary data unit.

In order to generate the compression image 200, the source image 100 is acquired, and RGB data units of each minimum code unit (MCU) thereof are converted into YUV data units. YUV is one of two primary color spaces used to represent digital image component (the other is RGB). The difference between YUV and RGB is that YUV represents color as brightness and two color difference signals, while RGB represents color as red, green and blue. In YUV, the Y is the brightness (luminance), U is blue minus luminance (B−Y) and V is red minus luminance (R−Y). Preferably, each data unit contains 8×8 pixels as shown in FIG. 2.

Figure 3A:
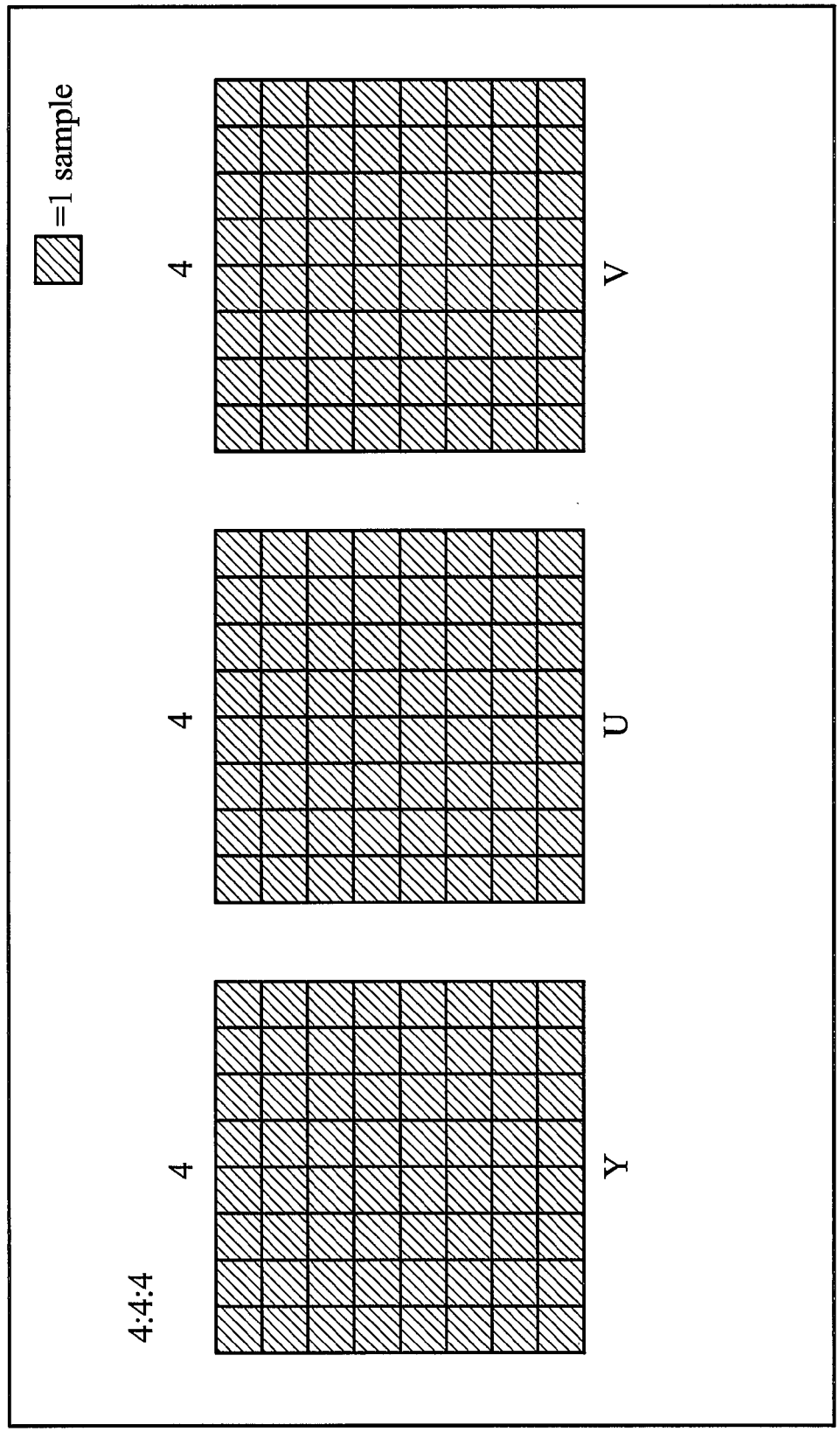
FIG. 3a is a diagram of exemplary 4:4:4 format.

In order to compress bandwidth, U and V may further be sampled at a lower rate than Y, which is technically known as "chrominance subsampling" or "chrominance down-sampling." Some color information in the image signal is being discarded, but not brightness (luminance) information. YUV is designated as "4:m:n". The "4" typically represents a sampling rate of 13.5 MHz. The next two digits represent the U and V rate. Various image formats are further described with references made to the accompanying drawings. FIG. 3a is a diagram of exemplary 4:4:4 format, where U and V are sampled at the same full rate as the luminance. When employing 4:4:4 format, an MCU may comprise (Y,U,V) data units.

Figure 3B:
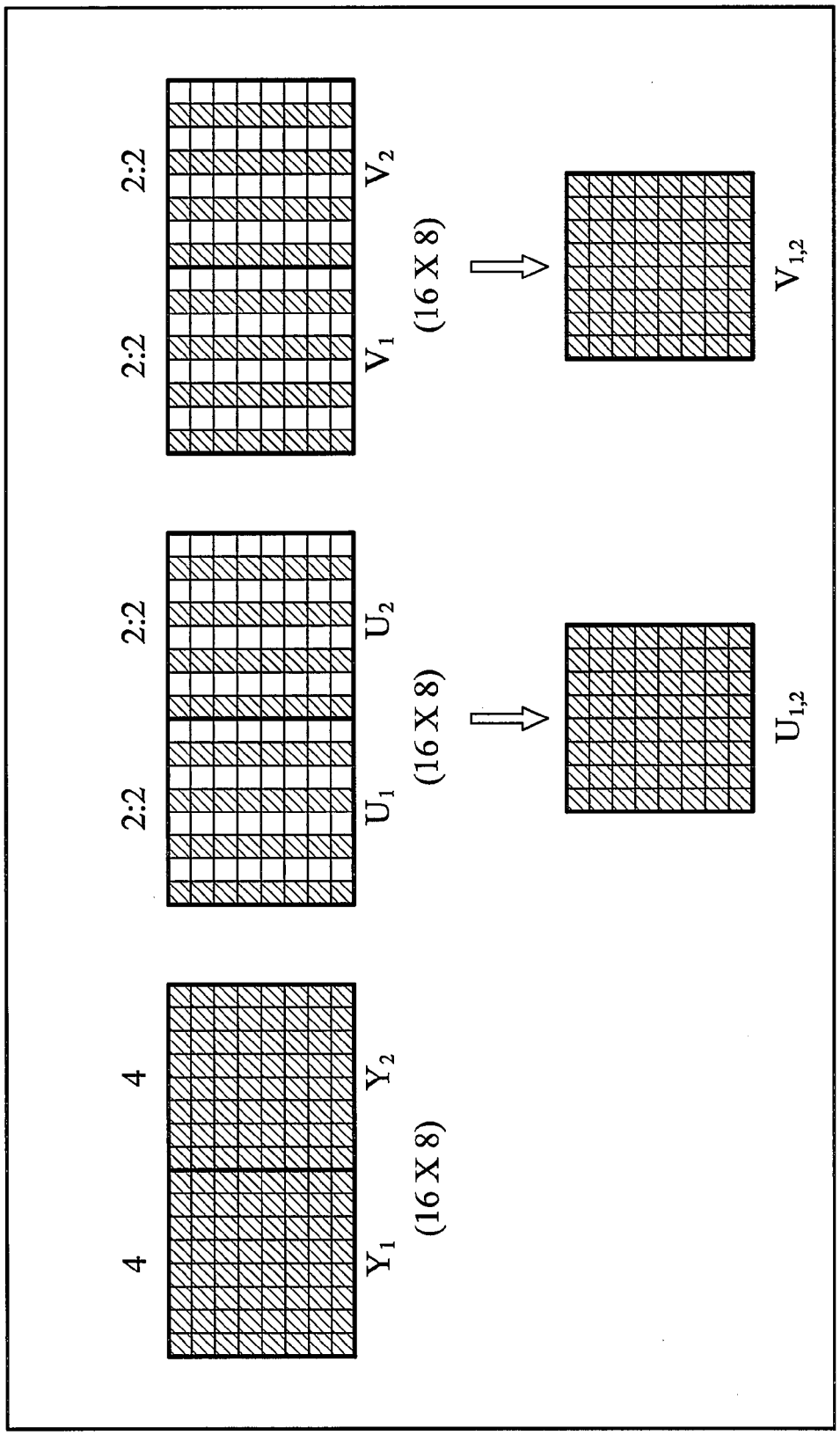
FIG. 3b is a diagram of exemplary 4:2:2 co-sited format.
Figure 3C:
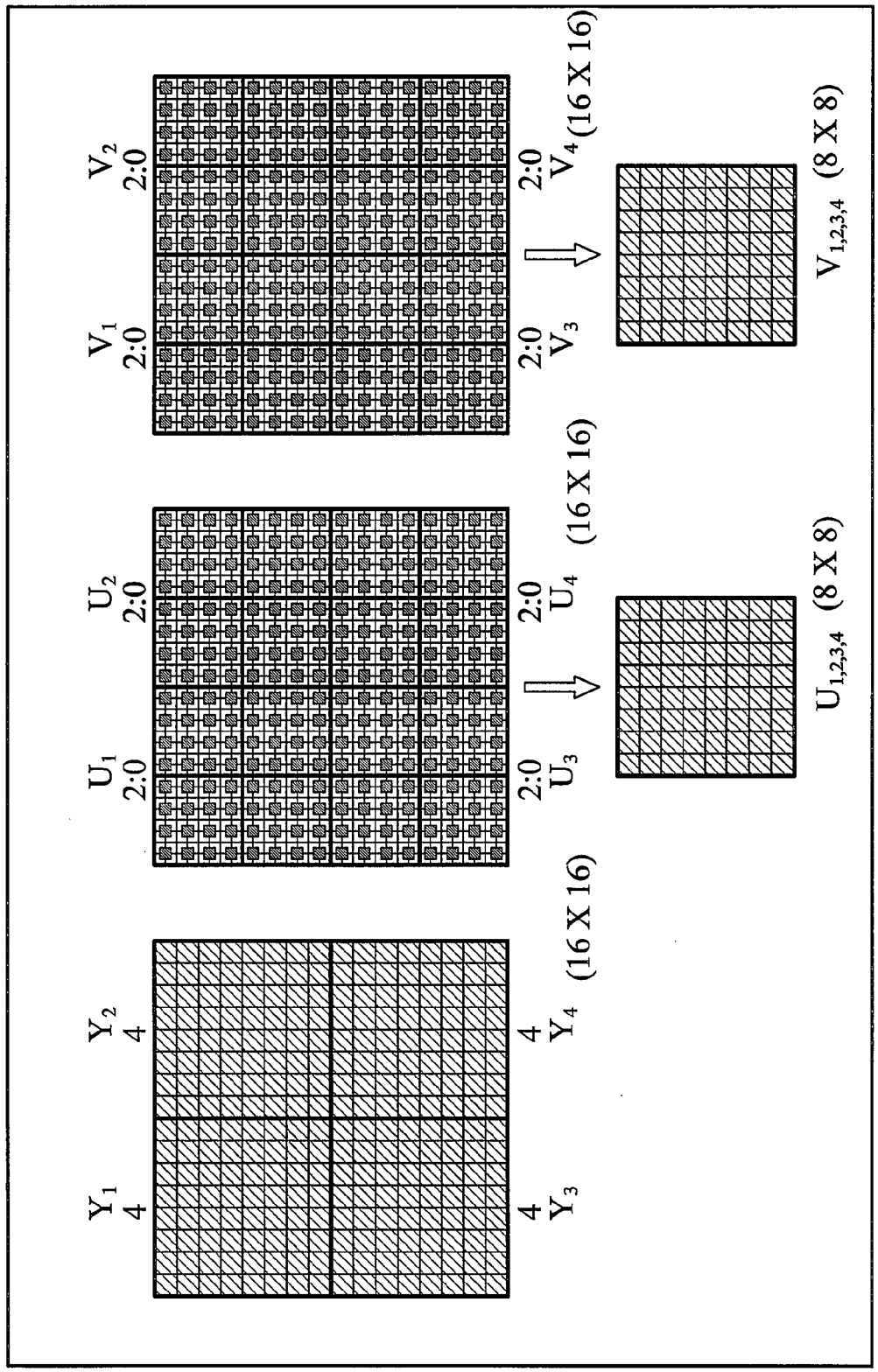
FIG. 3c is a diagram of exemplary 4:2:0 format.

FIG. 3b is a diagram of exemplary 4:2:2 co-sited format, where U and V are sampled at half of the horizontal resolution of Y. The term of "co-sited" means that U/V samples are taken at the same time as Y. When employing the 4:2:2 co-sited format, an MCU may comprise four data units ($Y_1$, $Y_2$, $U_{1,2}$, $V_{1,2}$). FIG. 3c is a diagram of exemplary 4:2:0 format, where the zero in 4:2:0 means that U and V may be sampled at half of the vertical resolution of Y. When employing 4:2:0 format, an MCU may comprise six data units ($Y_1$, $Y_2$, $Y_3$, $Y_4$, $U_{1,2,3,4}$, $V_{1,2,3,4}$).

Figure 4:
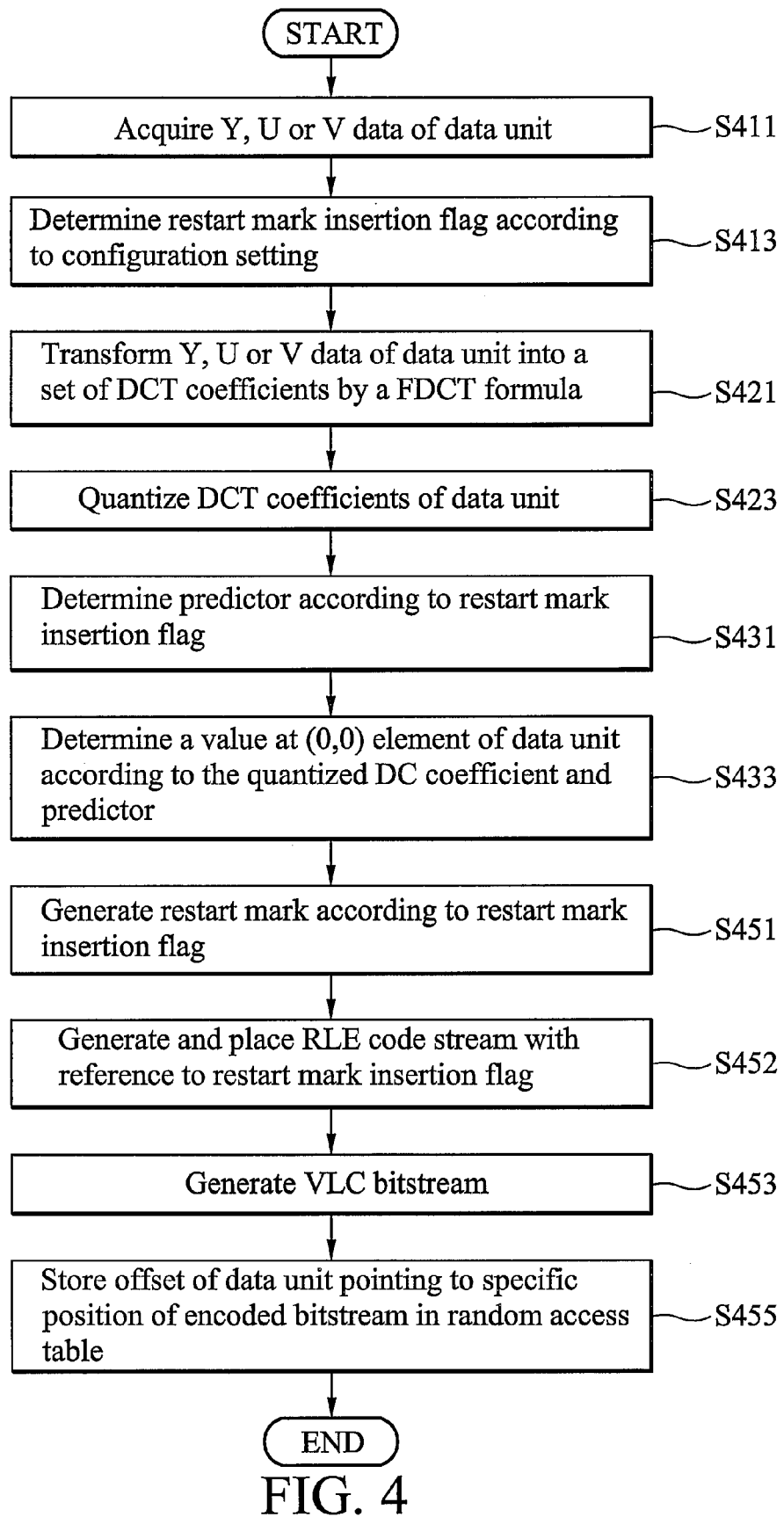
FIG. 4 is a flowchart illustrating an embodiment of an encoding process for a data unit of a source image.

After chrominance down-sampling, each resulting Y, U or V data unit of the source image 100 is encoded by forward discrete cosine transform (FDCT), quantization, zero run-length encoding (RLE), entropy encoding and the like. FIG. 4 is a flowchart illustrating an embodiment of an encoding process for a data unit of the source image 100 (FIG. 1), performed by the processing unit/image encoder 110 (FIG. 1). Y, U or V data of a data unit is acquired (S411). A restart mark insertion flag is determined according to a configuration setting and the current position that the data unit locates (S413). The configuration setting indicates one of certain insertion policies. A first insertion policy may instruct that a restart mark, a predefined pattern, is inserted ahead of every data unit. A second insertion policy may instruct that a restart mark is inserted ahead of every MCU. A third insertion policy may instruct that a restart mark is inserted ahead of every certain number of MCUs, such as every 2 or more MCUs. The restart mark insertion flag is set to TRUE when a restart mark is required to be inserted ahead of a data unit. Otherwise, the restart mark insertion flag is set to FALSE. For an example, when the configuration setting indicates the first insertion policy, the restart mark insertion flag is set to TRUE for each data unit. For another example, the restart mark insertion flag is set to TRUE when the configuration setting indicates the second insertion policy and a data unit is the beginning Y, U or V data unit of a MCU. For still another example, the restart mark insertion flag is set to TRUE when the configuration setting indicates the third insertion policy instructing that a restart mark is inserted ahead of every two MCUs, a data unit is the beginning Y, U or V data unit of this MCU and no restart marks are inserted ahead of data units of a prior MCU.

Figure 5:
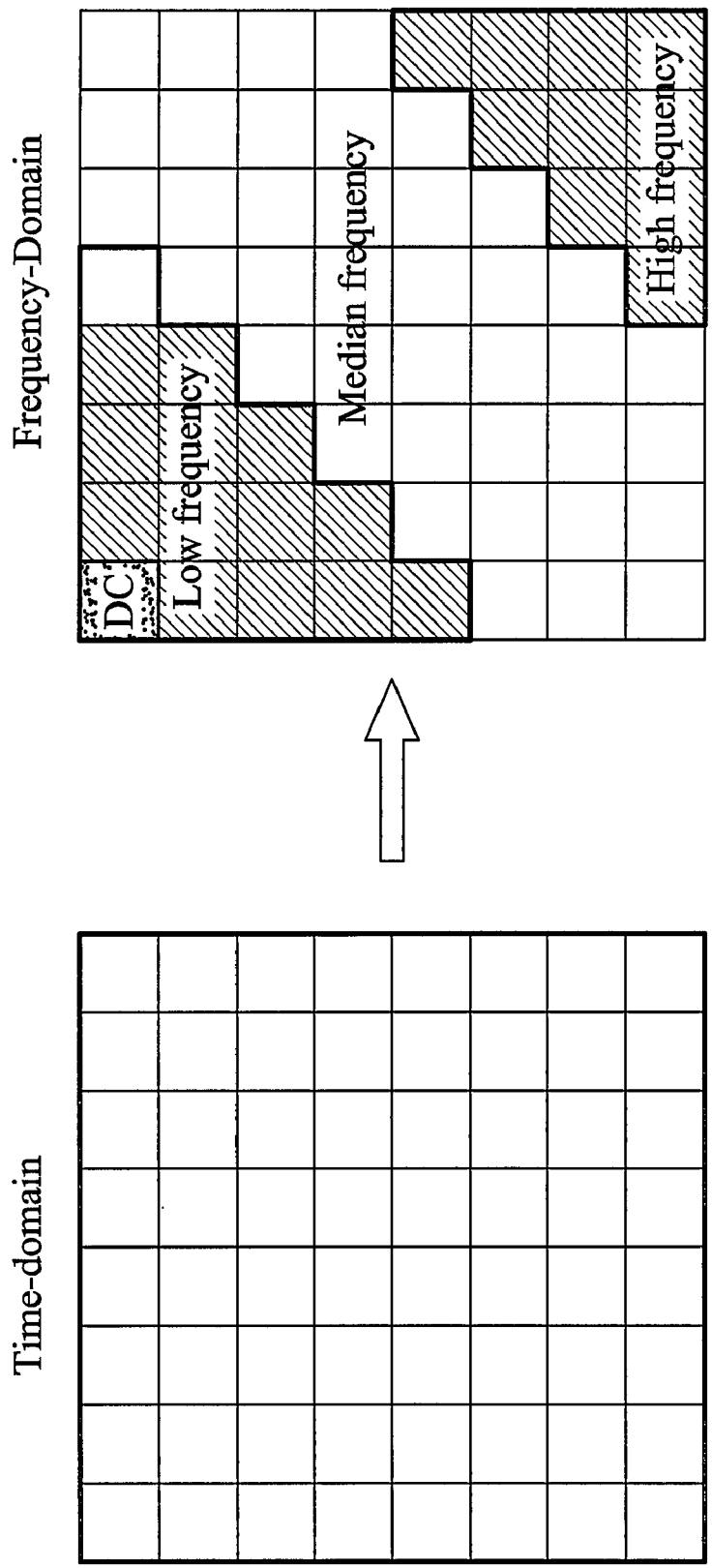
FIG. 5 is a schematic diagram of DCT for transforming a time-domain data unit into a frequency-domain data unit.

Y, U or V data of the data unit is transformed into a set of frequencies (also called DCT coefficients) by a forward discrete cosine transform (FDCT) formula (S421). For an instance, when a data unit is composed of 8×8 pixels, frequency of each pixel of the data unit may be calculated by the following FDCT formula:

$$S_{vu} = \frac{1}{4} C_u C_v \sum_{x=0}^{7} \sum_{y=0}^{7} S_{yx} \cos\frac{(2x+1)u\pi}{16} \cos\frac{(2y+1)v\pi}{16},$$

where $C_u$, $C_v = 1/\sqrt{2}$ for u, v=0, $C_u$, $C_v = 1$ for otherwise, and $S_{yx}$ represents real data of Y, U or V of the y-th row and the x-th column of the data unit. The result is an 8×8 transform coefficient array in which the (0,0) element is the DC (zero-frequency) coefficient and entries with increasing vertical and horizontal index values represent higher vertical and horizontal spatial frequencies. Elements other than the (0,0) element in the resulting array are typically called as AC coefficients. FIG. 5 is a schematic diagram of DCT for transforming a time-domain data unit into a frequency-domain data unit.

Figure 6B:
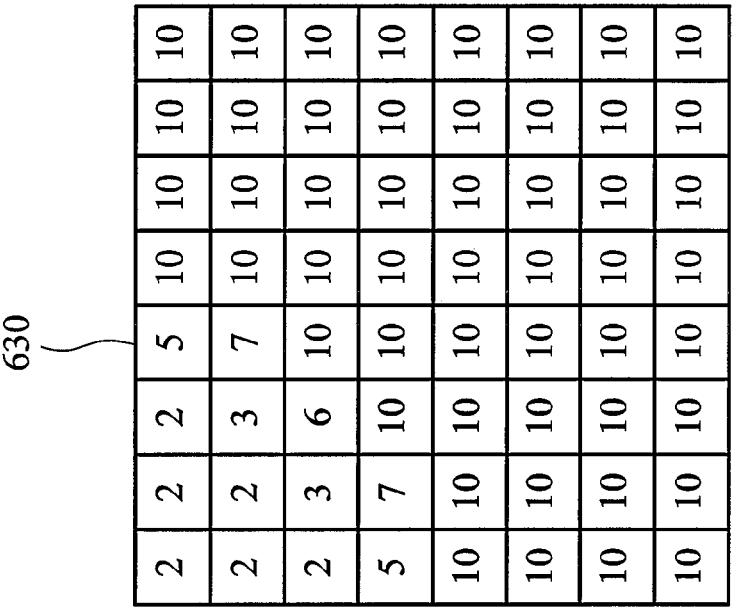
FIGS. 6a and 6b are diagrams of exemplary luminance and chrominance base tables.
Figure 6A:
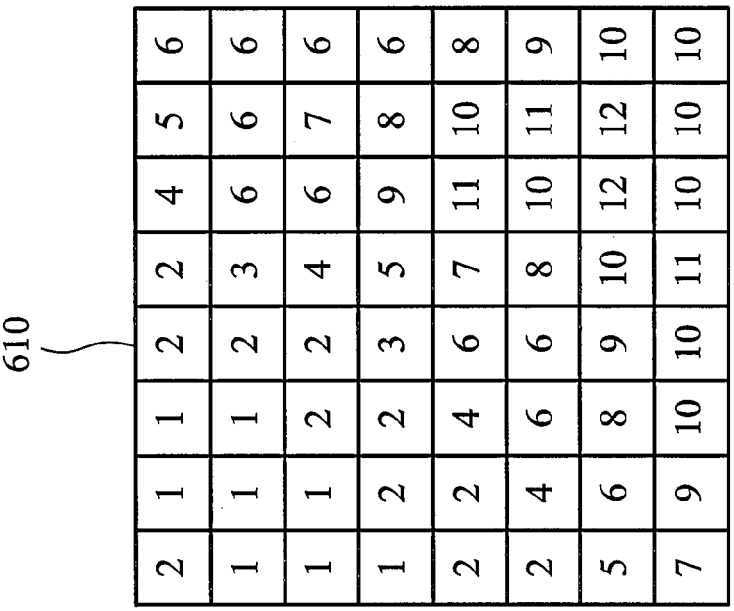

The transformed DCT coefficients of the data unit are quantized with reference to a predefined luminance base table or a predefined chrominance base table (S423). FIG. 6a is an exemplary luminance base table 610 provided for quantizing luminance (Y) DCT coefficients. FIG. 6b is an exemplary chrominance base table 630 provided for quantizing chrominance (U or V) DCT coefficients. Each luminance or chrominance DCT coefficient in the data unit (i.e. a frequency-domain block) is divided into a corresponding quantization scale (typically an integer) of a luminance base table or a chrominance base table, and then rounds the divided one to the nearest integer. Each luminance or chrominance DCT coefficient $S_{vu}$ may be quantized by the following quantization equation with reference to the luminance base table 610 or the chrominance base table 630:

$$Sq_{vu} = \text{round}\left(\frac{S_{vu}}{Q_{vu}}\right),$$

where $S_{vu}$ represents a luminance or chrominance DCT coefficient of the v-th row and the u-th column, and $Q_{vu}$ represents a quantization scale of the v-th row and the u-th column present in the luminance base table 610 or the chrominance base table 630.

Figure 7A:
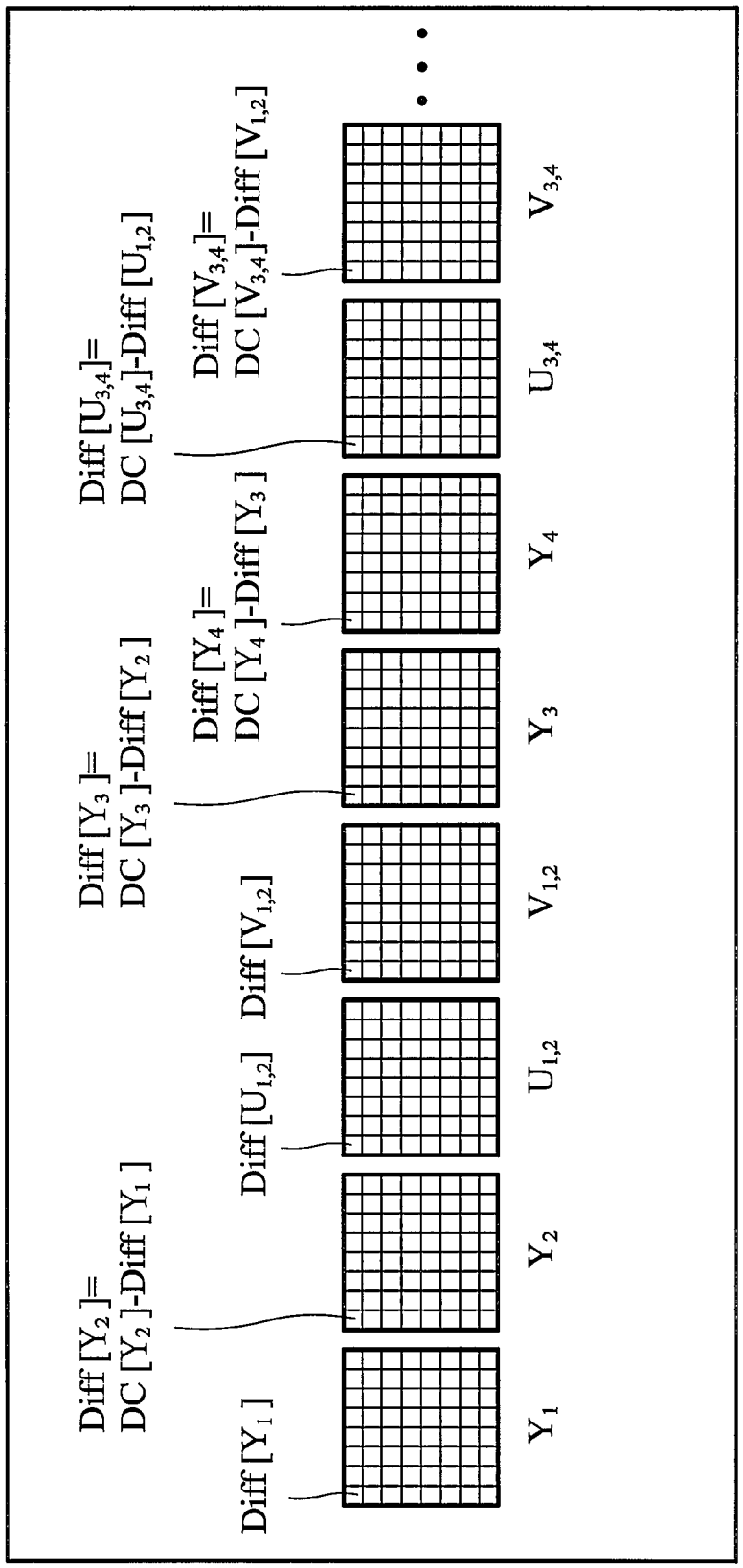
FIG. 7a is a diagram of [0,0] element calculation during encoding for several data units as the restart mark insertion flags being FALSE.
Figure 7B:
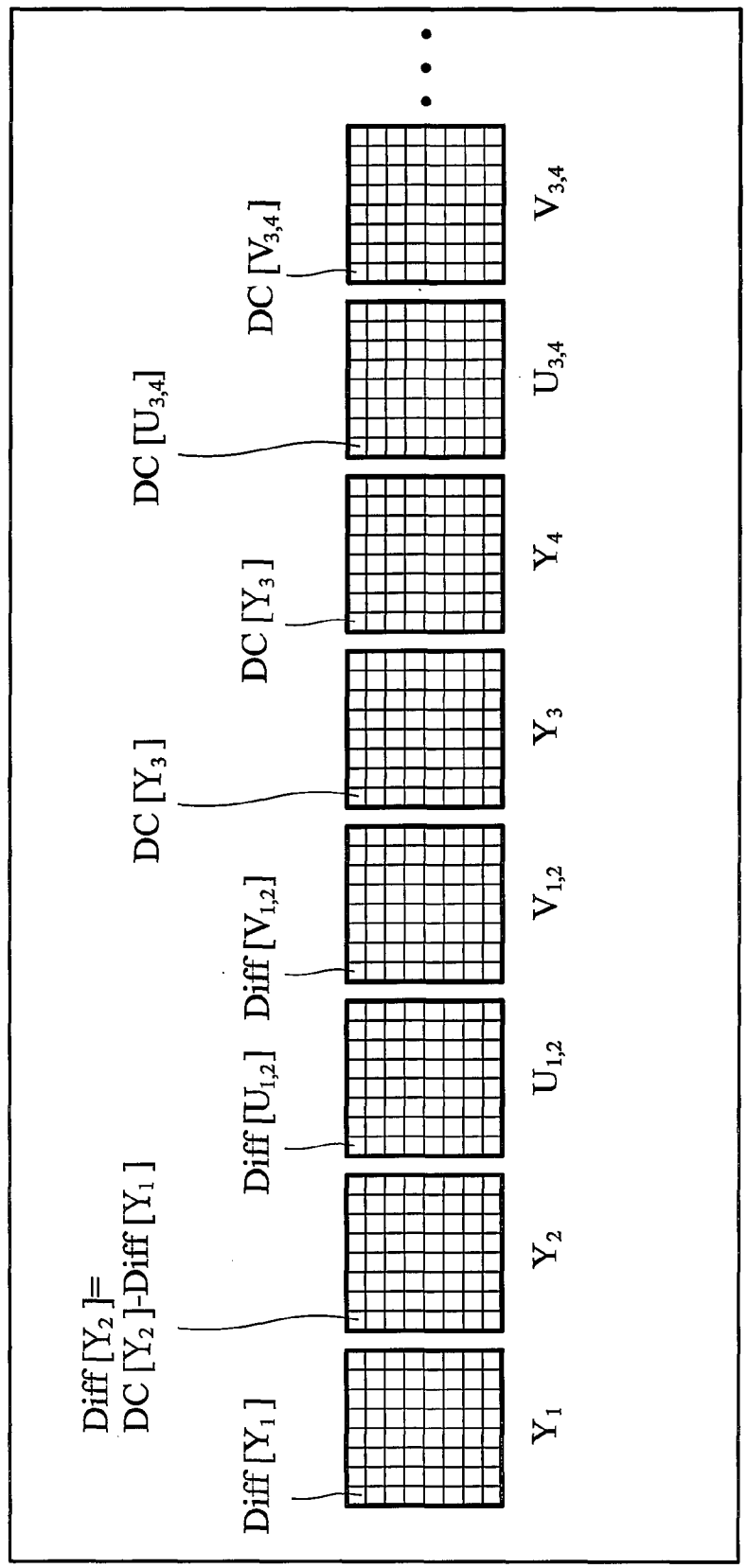
FIG. 7b is a diagram of [0,0] element calculation during encoding for several data units as the restart mark insertion flags respectively being one of TRUE and FALSE.

A predictor is determined according to the restart mark insertion flag (S431). The predictor is set to zero when the restart mark insertion flag is TRUE, otherwise, the predictor is set to a value at the (0,0) element of a prior Y, U or V data unit, also referred to as a prior DC coefficient or a DC difference of a prior Y, U or V data unit. A value at the (0,0) element of the data unit is determined according to the quantized DC coefficient and the determined predictor. The value at the (0,0) element of the data unit may be calculated by the following formula:

Diff=zz(0)-pred;

where "Diff" represents the resulting value at the (0,0) element of the data unit, zz(0) represents the quantized DC coefficient generated by step S423, and "pred" represents the predictor determined by step S431. It is to be understood that the resulting value is the quantized DC coefficient when the restart mark insertion flag is TRUE, and the resulting value is a DC difference calculated by subtracting the quantized DC coefficient from a value at the (0,0) element of a prior Y, U or V data unit when the restart mark insertion flag is FALSE. That is, the (0,0) element value of the data unit is independent from the previous encoding results when the restart mark insertion flag is TRUE, otherwise, the (0,0) element value of the data unit varies with the previous encoding results. FIG. 7a is a diagram of [0,0] element calculation during encoding for several data units as the restart mark insertion flag being FALSE. For instances as shown, the [0,0] element of data unit $Y_3$ is Diff[$Y_3$]=DC[$Y_3$]−Diff[$Y_2$], the [0,0] element of data unit $U_{3,4}$ is Diff[$U_{3,4}$]=DC[$U_{3,4}$]−Diff[$U_{1,2}$], and the [0,0] element of data unit $V_{3,4}$ is Diff[$V_{3,4}$]=DC[$V_{3,4}$]−Diff[$V_{1,2}$]. FIG. 7b is a diagram of [0,0] element calculation during encoding for several data units as the restart mark insertion flags respectively being one of TRUE and FALSE. For instances as shown, when encoding of data units $Y_1$, $Y_2$, $U_{1,2}$, $V_{1,2}$ and $Y_4$, the restart mark insertion flags are FALSE, resulting in that the [0,0] elements of data units $Y_1$, $Y_2$, $U_{1,2}$, $V_{1,2}$ and $Y_4$ respectively varies with that of prior data units. When encoding of data units $Y_3$, $U_{3,4}$ and $V_{3,4}$, the restart mark insertion flags are TRUE, resulting in that the [0,0] elements of data units $Y_3$, $U_{3,4}$ and $V_{3,4}$ are independent from that of prior data units.

Figure 9:
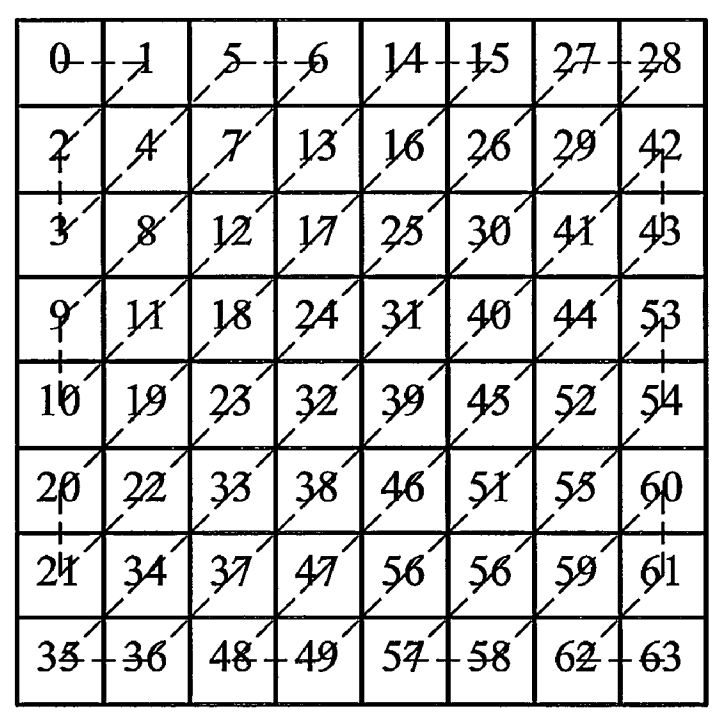

Referring to FIG. 4, a restart mark is provided when the determined restart mark insertion flag is TRUE (step S451). All quantized DCT coefficients are sequentially encoded by a zero run-length encoding (RLE) method to generate a RLE code stream (step S452). Specifically, the RLE code stream is placed adjacent to the restart mark when the determined restart mark insertion flag is TRUE, otherwise, the RLE code stream is placed adjacent to the prior RLE code stream (step S452). The restart mark can be recognized by a decoder, indicating that the (0,0) element value of this data unit is a quantized DC coefficient independent from a (0,0) element value of the prior Y, U or V data unit. FIG. 8a illustrates an exemplary RLE stream containing no restart marks corresponding to FIG. 7a. FIG. 8b illustrates an exemplary RLE stream containing three restart marks M81 to M85 corresponding to FIG. 7b. The quantized DCT coefficients, calculated DC differences and inserted restart marks of the data unit are sequentially aligned in a zig-zag order as shown in FIG. 9, to generate a RLE code stream. As a result, each quantized luminance or chrominance DC coefficient or difference is encoded into a RLE code combination of a size and amplitude, where the amplitude stores a one's complement of the quantized luminance or chrominance DC coefficient or DC difference, and the size stores the length of the amplitude (in bits). Each quantized luminance or chrominance AC coefficient except for the "zero" coefficient is encoded into a RLE code combination of a run-length, a size and an amplitude, where the run-length stores a total number of continuous quantized "zero" AC coefficients following this quantized AC coefficient, the amplitude stores a one's complement of this quantized AC coefficient, the size stores the length of the amplitude (in bits). For example, when seven continuous quantized "zero" AC coefficients follow a quantized "non-zero" AC coefficient, the run-length for the quantized non-zero AC coefficient is "seven".

Figure 10B:

Referring to FIG. 4, the generated RLE code stream is encoded by an entropy encoding method (e.g. Huffman encoding) with reference to a luminance DC coefficient/difference mapping table, a luminance AC coefficient mapping table, a chrominance DC coefficient/difference mapping table and a chrominance AC coefficient mapping table, to generate a variable length coding (VLC) bitstream (step S453). The entropy encoding method encodes more frequent values with shorter codes. Specifically, the entropy encoding method converts each size of an RLE code combination for a quantized luminance DC coefficient/difference into a code word (e.g. Huffman code word) with reference to the luminance DC coefficient/difference mapping table. The size of each RLE combination for a quantized chrominance DC coefficient/difference is converted into a code word with reference to the chrominance DC coefficient/difference mapping table. The entropy encoding method converts each run-length/size of a RLE code combination for a quantized luminance "non-zero" AC coefficient into a code word with reference to the luminance AC coefficient mapping table. Each run-length/size of a RLE code combination for a quantized chrominance "non-zero" AC coefficient into a code word with reference to the chrominance AC coefficient mapping table. FIGS. 10a and 10b are diagrams of exemplary luminance DC coefficient/difference mapping and luminance AC coefficient mapping tables 910 and 930. For example, an RLE combination for a luminance AC coefficient containing a run-length "1", a size "4" and amplitude "0111" is converted into a code word "1111101100111" with reference to the luminance AC coefficient mapping table 930. It is to be understood that the generated VLC bitstream with a restart mark (if necessary) of this data unit will be appended to a previously encoded bitstream corresponding to former data units.

Figure 11A:
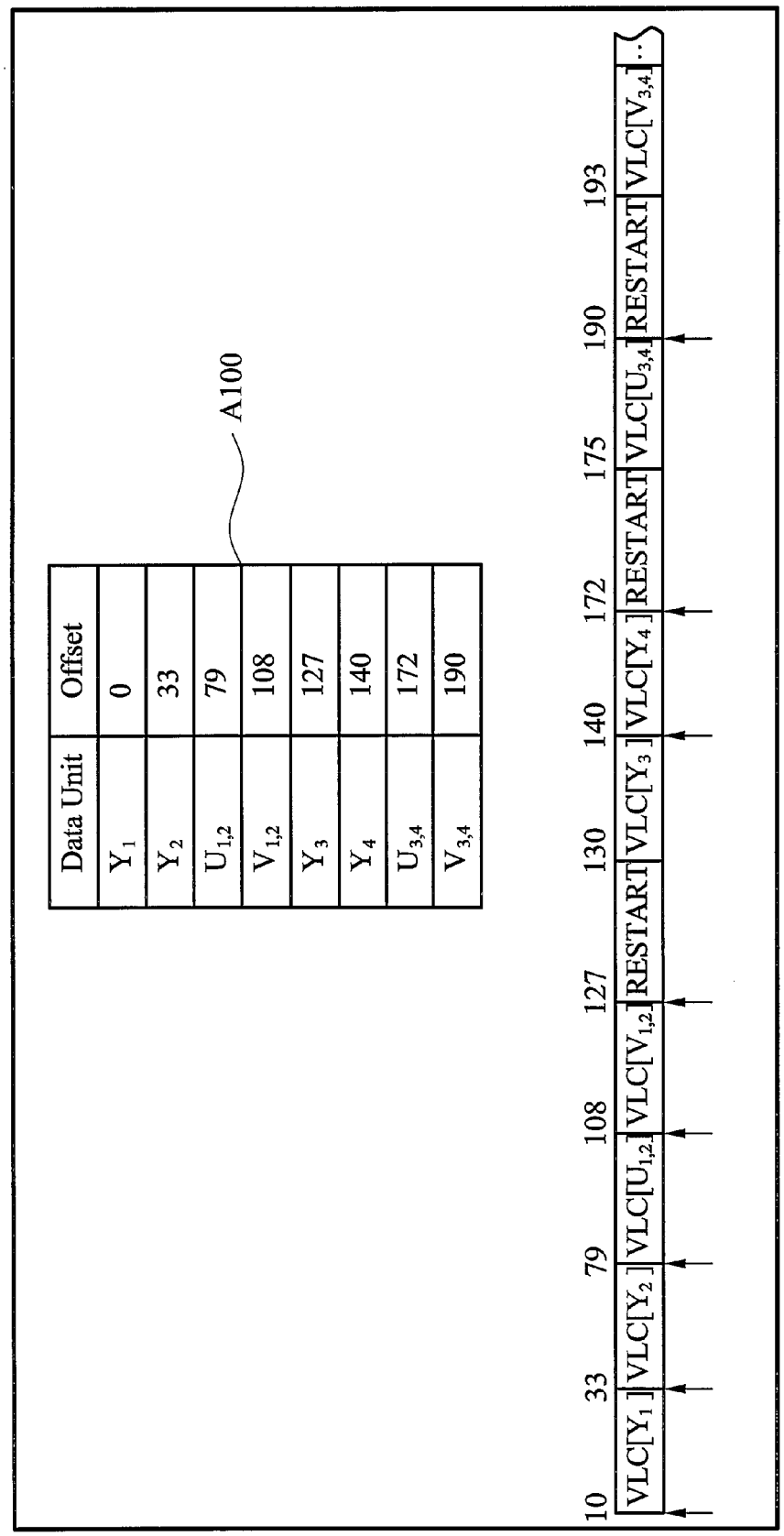
FIG. 11A and 11B is a schematic diagram illustrating an exemplary VLC bitstream accompanying with an exemplary random access table.
Figure 11B:
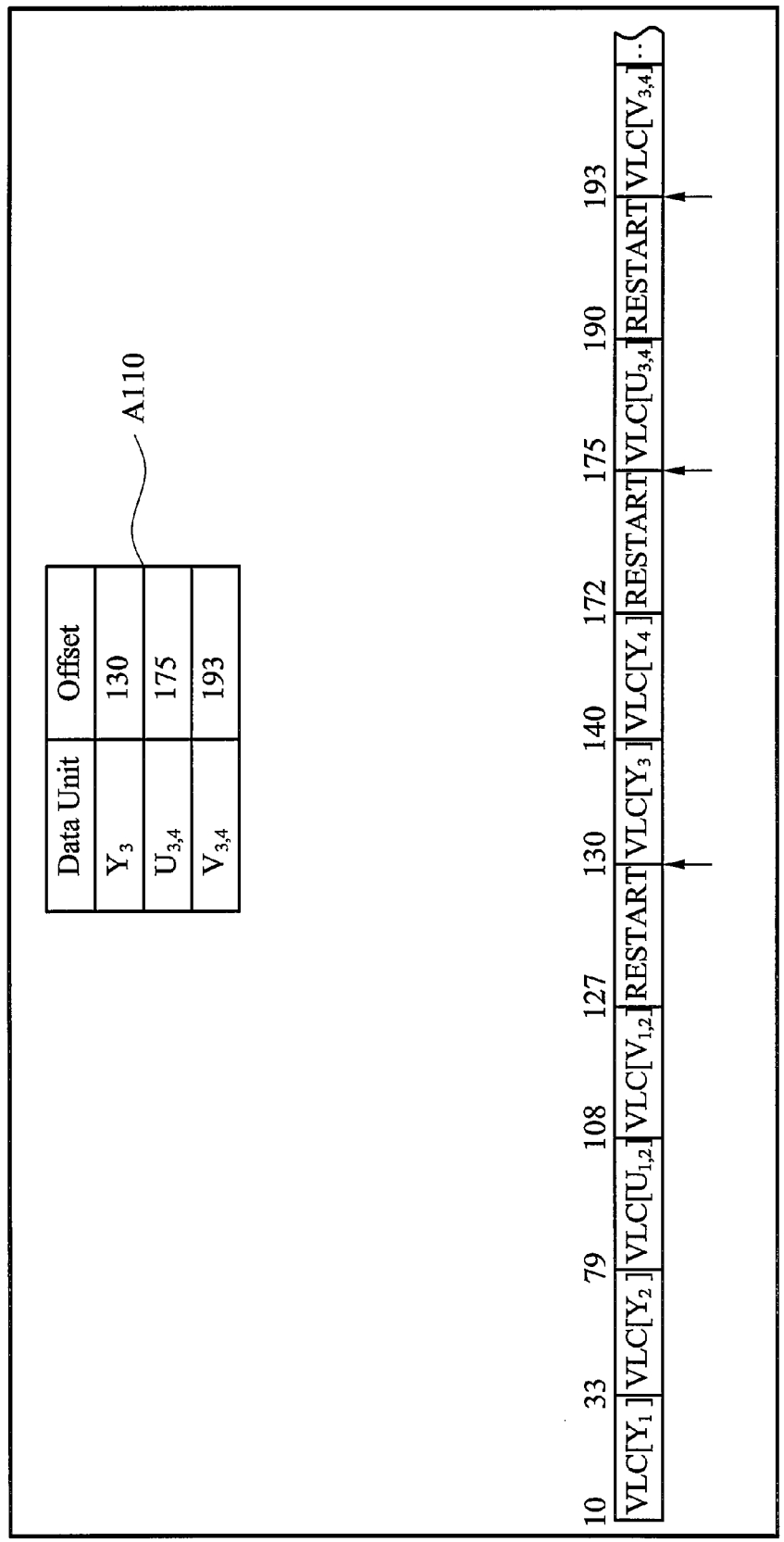

Referring to FIG. 4, an offset of the data unit pointing to a specific position of the encoded bitstream is stored in a random access table (step S455). The offset points to the beginning position of the inserted restart mark followed by the data unit, or the beginning position of the data unit when the restart mark insertion flag thereof is TRUE, or to the beginning position of data unit of VLC stream when the restart mark insertion flag thereof is FALSE. It should be noted that the offset can be utilized by a decoder to forward or return to a specific position of the generated VLC stream thereby decoding the remaining portion thereof. The random access table may be stored in a volatile memory for efficient access, and/or stored in a nonvolatile memory or storage device to prevent data loss when occurring exceptional power loss or errors. Those skilled in the art may modify this step to improve performance with storing nothing in the random access table when the restart mark insertion flag thereof is FALSE. FIG. 11a is a schematic diagram illustrating an exemplary VLC bitstream accompanying with an exemplary random access table A100. The random access table A100 stores multiple offsets each pointing to a position of the beginning of a data unit or a restart mark corresponding to a data unit. FIG. 11b is a schematic diagram illustrating another exemplary VLC bitstream accompanying with an exemplary random access table A110. The random access table A110 stores multiple offsets each pointing to a position of the beginning of a data unit adjacent to a restart mark.

Figure 12:
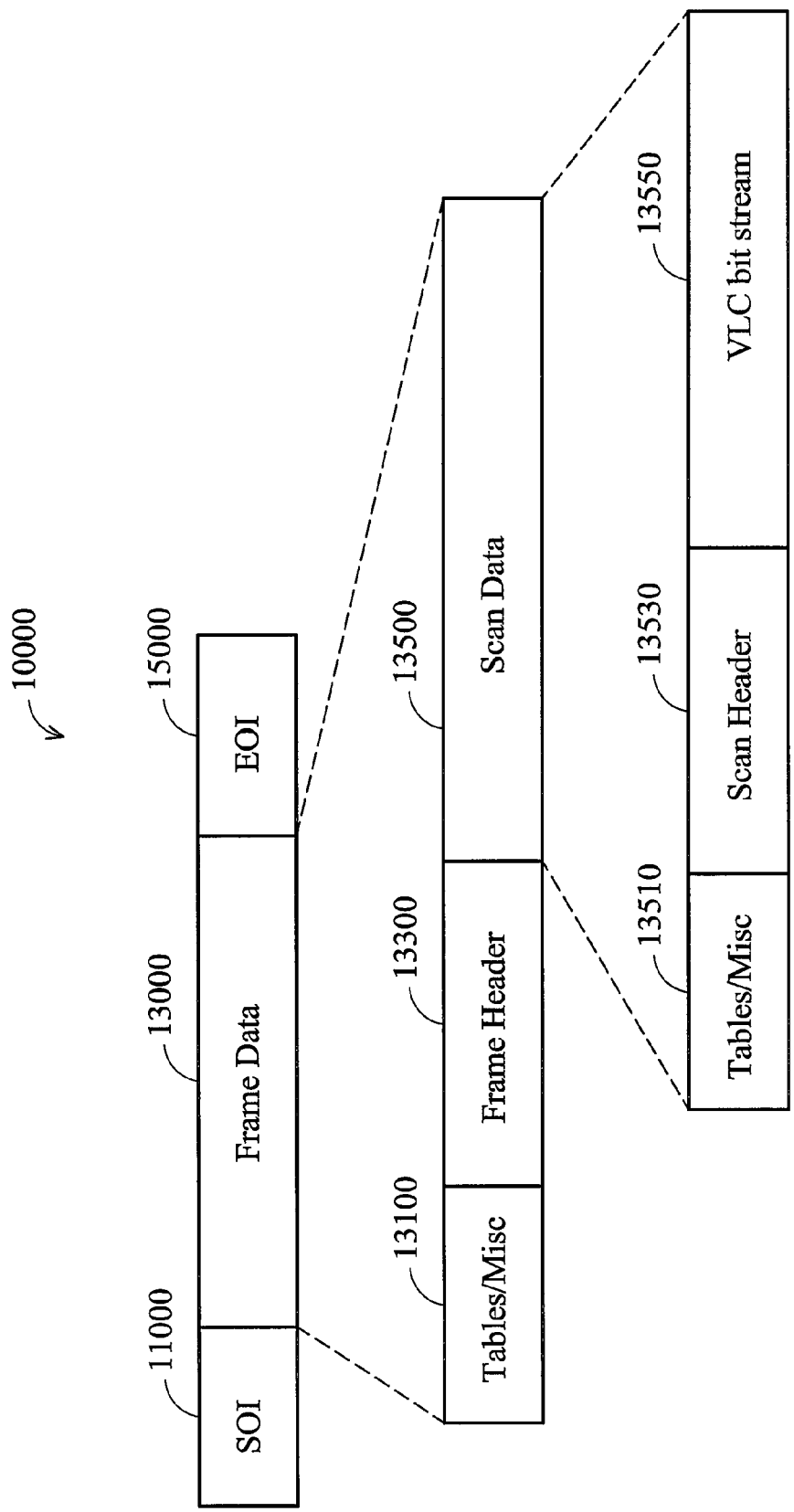
FIG. 12 is a diagram of the data structure of an exemplary JPEG image.

After all data units of the source image 100 (FIG. 1) is completely encoded, the compression image 200 (FIG. 1) containing the generated VLC bitstream and random access table is generated. FIG. 12 is a diagram of the data structure of an exemplary JPEG image 10000 containing two anchors, start-of-image (SOI) 11000 and end-of-image (EOI) 15000, and frame data 13000 therebetween. The frame data 13000 is composed of tables/misc 13100, a frame header 13300 and scan data 13500. The tables/misc 13100 stores the luminance base table 610 (FIG. 6a) and the chrominance base table 630 (FIG. 6b). The tables/misc 13100 may further store the generated random access table. The scan data 13500 is composed of tables/misc 13510, a scan header 13530 and the generated VLC bitstream 13550 containing restart marks. The tables/misc 13510 stores a luminance DC difference mapping table, a luminance AC coefficient mapping table, a chrominance DC difference mapping table and a chrominance AC coefficient mapping table. The tables/misc 13510 may further store the generated random access table.

Figure 13:
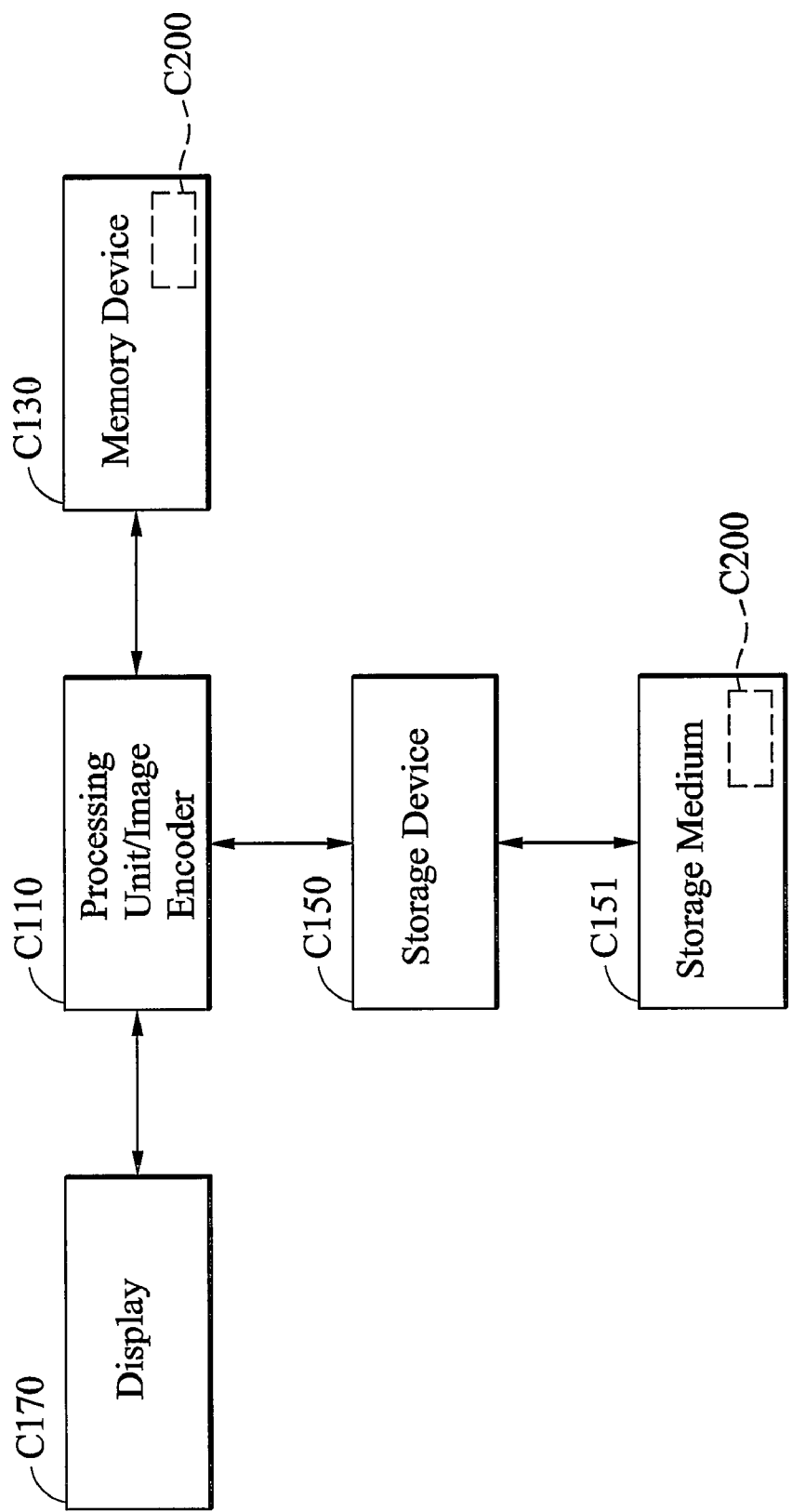
FIG. 13 is a diagram of a hardware environment applicable to an embodiment of an electronic device.

FIG. 13 is a diagram of a hardware environment applicable to an embodiment of an electronic device comprising a processing unit/image decoder C110 (also referred to as an image decoding unit), a memory device C130, a storage device C150, and a screen C170. A compression image C200 in a particular compression format such as the Joint Photographic Experts Group (JPEG) format may be stored in the memory device C130 such as dynamic random access memory (DRAM), synchronous DRAM (SDRAM), flash memory device or similar, or a storage medium C151 such as a compact flash (CF), memory stick (MS), smart media (SM), or SD memory card or similar, loaded by the storage device C150. The screen C170 may be a color super-twisted nematic (CSTN) display, a thin film transistor-liquid crystal display (TFT-LCD), an organic light-emitting diode (LED) display or similar. Details of the content of the compression image C200 with the generation process thereof may follow the above description. The processing unit/image decoder C110 determines a decoding start point, decodes the compression image C200 thereafter and displays the decoding results on the display C170.

Figure 14:
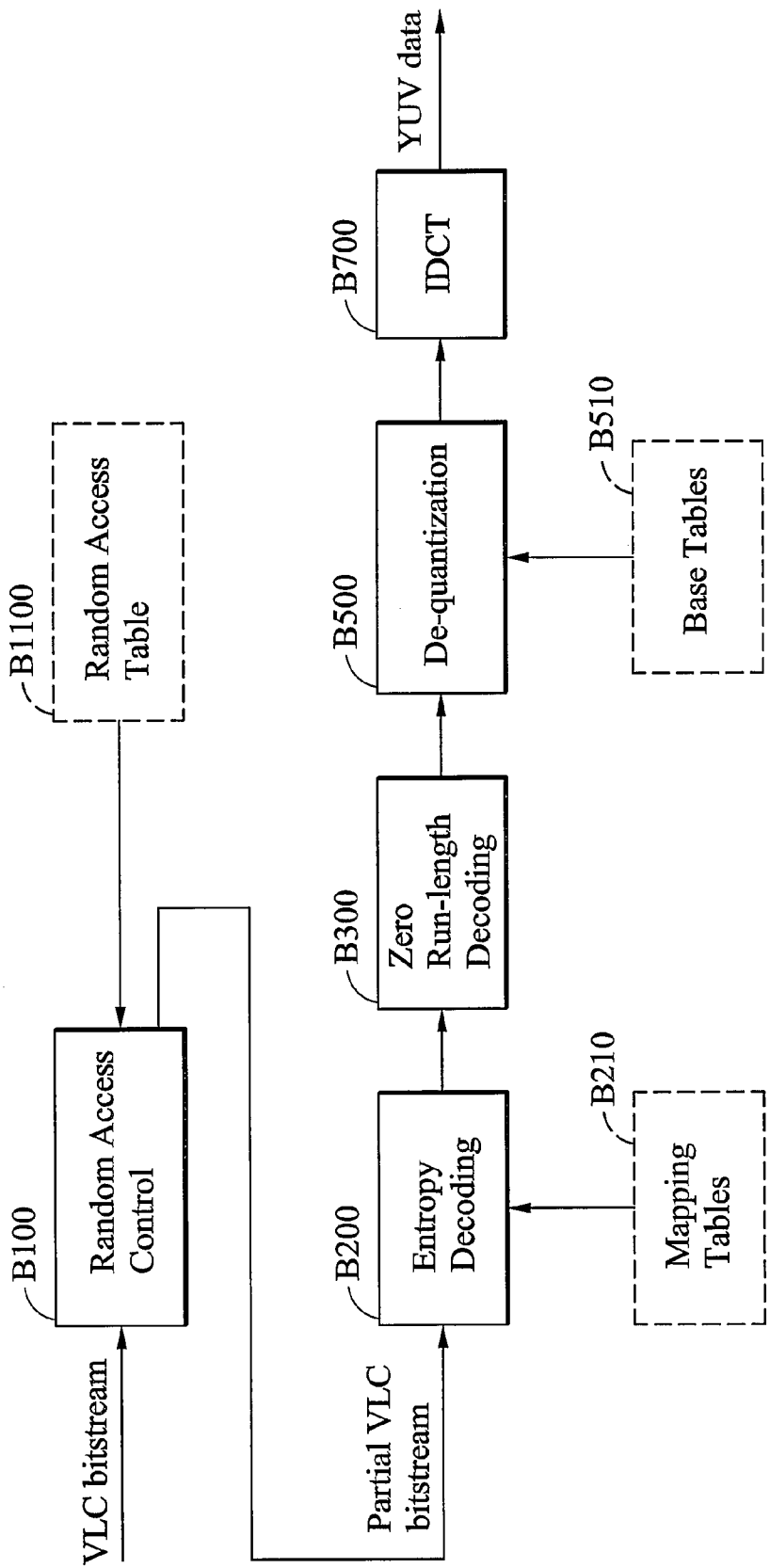
FIG. 14 is a diagram of an exemplary image decoding with random access control.

FIG. 14 is a diagram of an exemplary image decoding with random access control, performed by the processing unit/image decoder C110. The encoded bitstream is decoded by sequentially performing a random access control B100, a entropy decoding B200, a zero run-length decoding B300, a de-quantization B500 and an inverse discrete cosine transform (IDCT) B700 to generate portions of a decoded image. The random access control B100 acquires a random access table B110 from a compression image file (e.g. A100 of FIG. 11), finds an offset corresponding to a portion of the encoded bitstream to be decoded, accordingly acquires that portion thereof, and outputs to the entropy decoding B200. The random access control B100 may further skip a segment of encoded bitstream corresponding to several data units or MCUs without restart marks ahead after the found offset. Contrary to the step S453 (FIG. 4), the entropy decoding B200 converts VLC code words (e.g. Huffman codes) of the input encoded bitstream into RLE codes with reference to mapping tables B210 such as the above luminance DC difference, luminance AC coefficient, chrominance DC difference and chrominance AC coefficient mapping tables, to generate a VLD code stream.

Figure 15:
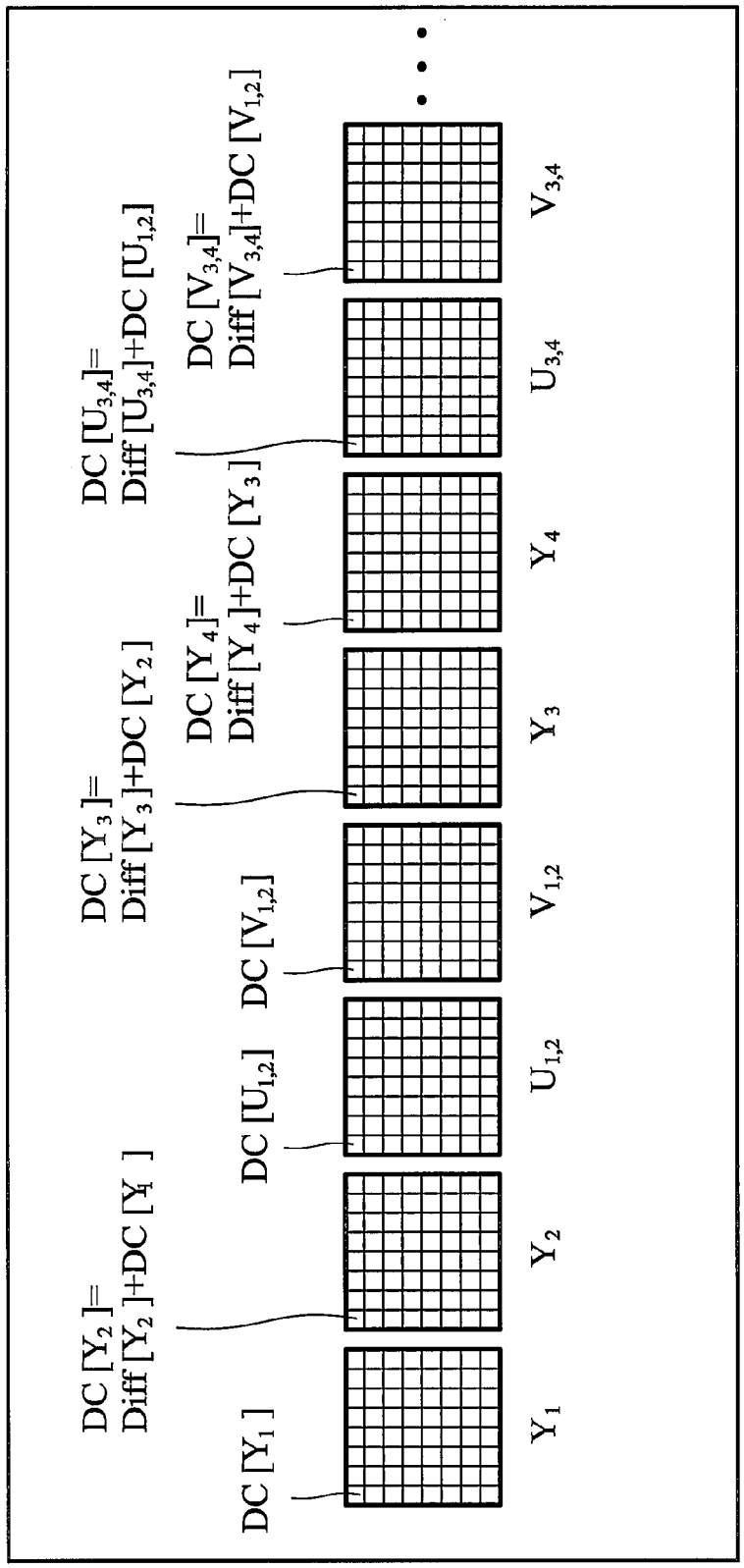
FIG. 15 is a diagram of DC coefficient calculation for data units following no restart marks.

Contrary to step S451 (FIG. 4), the zero run-length decoding B300 decodes the previously generated VLD code stream to acquire a series of RLE code combinations with restart marks. Each RLE code combination is converted into a quantized Y, U or V DC coefficient or DC difference, or a quantized Y, U or V AC coefficient. For each data unit, the zig-zag sequence of quantized Y, U or V AC coefficients, as shown in FIG. 9, is rearranged into an original sequence for scanning a data block. It should be noted, when a restart mark is present ahead of a Y, U or V data unit, the (0,0) element thereof is a quantized Y, U or V DC coefficient followed by a series of quantized luminance or chrominance AC coefficients. That is, the (0,0) element thereof is independent from that of a prior corresponding Y, U or V data unit. When no restart marks is present ahead of a Y, U or V data unit, the (0,0) element thereof is a quantized Y, U or V DC difference followed by a series of quantized Y, U or V AC coefficients, and the quantized Y, U or V DC coefficient of data unit is calculated by adding a quantized Y, U or V DC coefficient of a prior corresponding Y, U or V data unit. FIG. 15 is a diagram of DC coefficient calculation for data units following no restart marks. For instance, the quantized DC coefficient of data unit $Y_3$ is $DC[Y_3]=Diff[Y_3]+DC[Y_2]$, the quantized DC coefficient of data unit $U_{3,4}$ is $DC[U_{3,4}]=Diff[U_{3,4}]+DC[U_{1,2}]$, and the quantized DC coefficient of data unit $V_{3,4}$ is $DC[V_{3,4}]=Diff[V_{3,4}]+DC[V_{1,2}]$.

Contrary to step S423 (FIG. 4), the quantized DC and AC coefficients of each data unit are de-quantized with reference to the predefined luminance and chrominance base tables B510 (also referring to 610 of FIG. 6a and 630 of FIG. 6b), to generate de-quantized DCT coefficients. Referring to FIG. 14, the de-quantization B500 multiplies each quantized luminance or chrominance DC or AC coefficient $Sq_{uv}$ by a corresponding quantization scale of a luminance base table or a chrominance base table, such as 610 of FIG. 6a or 630 of FIG. 6b, to generate a de-quantized luminance or chrominance DCT coefficient $S_{vu}$. For example, each quantized luminance or chrominance DC or AC coefficient $Sq_{vu}$ may be de-quantized by the following de-quantization equation with reference to the luminance base table 610 or the chrominance base table 630:

$$S_{vu}=Sq_{vu} \times Q_{vu},$$

where $Sq_{vu}$ represents a quantized luminance or chrominance DC or AC coefficient of the v-th row and the u-th column of a chrominance or luminance data unit, and $Q_{vu}$ represents a quantization scale of the v-th row and the u-th column of a chrominance or luminance data unit present in the luminance base table 610 or the chrominance base table 630.

Contrary to step S421 (FIG. 4), each de-quantized DCT coefficient of each Y, U or V data unit is transformed into decoded Y, U or V data by a inverse discrete cosine transform (IDCT) formula. For example, when a data unit is composed of 8×8 pixels, decoded Y, U or V data of each pixel of the data unit may be calculated by the following IDCT formula:

$$S_{yx} = \frac{1}{4}\sum_{x=0}^{7}\sum_{y=0}^{7} C_u C_v S_{vu} \cos\frac{(2x+1)u\pi}{16}\cos\frac{(2y+1)v\pi}{16},$$

where $C_u, C_v=1/\sqrt{2}$ for u, v=0, $C_u, C_v=1$ for otherwise, and $S_{vu}$ represents a DCT coefficient of the y-th row and the x-th column of a data unit. It is to be noted that, before displaying, the decoded Y, U or V data of each pixel of the data unit may be further undergone color interpolation and color space transform.

Methods for randomly accessing compressed images, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for encoding a source image comprising a plurality of data units, performed by an image encoding unit, comprising:
    generating a first quantized DC coefficient of a first data unit, and a plurality of first AC coefficients of the first data unit;
    determining a first value at the (0,0) element of the first data unit according to the first quantized DC coefficient;
    generating a first variable length coding (VLC) stream of the first data unit by encoding the determined first value and the first AC coefficients;
    generating an encoded bitstream comprising a restart mark followed by the first VLC stream of the first data unit;
    storing a first offset pointing to a location corresponding to the restart mark of the encoded bitstream in a random access table; and
    generating a compression image comprising the encoded bitstream and the random access table.

2. The method as claimed in claim 1 further comprising:
    generating a second quantized DC coefficient of a second data unit, and a plurality of second AC coefficients of the second data unit;
    determining a second value at the (0,0) element of the second data unit according to the second quantized DC coefficient;
    generating a second VLC stream of the second data unit by encoding the determined second value and the second AC coefficients;
    generating the encoded bitstream further comprising the second VLC stream of the second data unit; and
    storing a second offset pointing to the beginning of the second VLC stream of the encoded bitstream in the random access table.

3. The method as claimed in claim 2 wherein the first value at the (0,0) element of the first data unit is the first quantized DC coefficient, and the second value at the (0,0) element of the second data unit is generated by subtracting the second quantized DC coefficient from a quantized DC coefficient or a quantized DC difference of the (0,0) element of the prior data unit.

4. The method as claimed in claim 2 further comprising:
    providing information indicating that insertion of restart mark for the first data unit is required; and
    providing information indicating that insertion of restart mark for the second data unit is not required.

5. The method as claimed in claim 4 wherein whether insertion of restart mark for a data unit is required is determined according to an insertion policy.

6. The method as claimed in claim 5 wherein the insertion policies instructs that a restart mark is inserted ahead of every data unit, a restart mark is inserted ahead of every minimum code unit (MCU), or a restart mark is inserted ahead of every certain number of MCUs, and each MCU contains at least Y, U and V data units.

7. The method as claimed in claim 1 wherein the first data unit of the source image is a Y, U or V data unit, Y represents luminance, U represents blue minus luminance, and V represents red minus luminance.

8. The method as claimed in claim 1 wherein the first quantized DC coefficient is generated by quantizing a discrete cosine transform (DCT) coefficient using a quantization equation:

$$Sq_{vu} = \mathrm{round}\left(\frac{S_{vu}}{Q_{vu}}\right),$$

$Sq_{vu}$ represents the first quantized DC coefficient, $S_{vu}$ represents the DCT coefficient, and $Q_{vu}$ represents a quantization scale at the (0,0) element present in a base table.

9. The method as claimed in claim 8 wherein the DCT coefficient is transformed by a forward discrete cosine transform (FDCT) formula, and the FDCT formula transforms a time-domain data unit into a frequency-domain data unit.

10. The method as claimed in claim 1 wherein the determined first value and the first AC coefficients are encoded by a zero run-length encoding method and an entropy coding method.

11. The method as claimed in claim 1 wherein the first offset pointing to the beginning of the restart mark of the encoded bitstream, or a location corresponding to the beginning of the first data unit of the encoded bitstream.

12. A system for encoding a source image comprising a plurality of data units, comprising:
    an image encoding unit generating a first quantized DC coefficient of a first data unit, and a plurality of first AC coefficients of the first data unit, determining a first value at the (0,0) element of the first data unit according to the first quantized DC coefficient, generating a first variable length coding (VLC) stream of the first data unit by encoding the determined first value and the first AC coefficients, generating an encoded bitstream comprising a restart mark followed by the first VLC stream of the first data unit, storing a first offset pointing to a location corresponding to the restart mark of the encoded bitstream in a random access table, and generating a compression image comprising the encoded bitstream and the random access table.

13. The system as claimed in claim 12 further comprising a digital camera module, wherein the source image is captured via the digital camera module.

14. The system as claimed in claim 12 further comprising a storage device and a storage medium, wherein the source image is acquired from the storage medium via the storage device.

15. The system as claimed in claim 12 further comprising a storage device and a storage medium, wherein the compression image is stored in the storage medium via the storage device.

16. The system as claimed in claim 12 wherein the image encoding unit further generates a second quantized DC coefficient of a second data unit, and a plurality of second AC coefficients of the second data unit, determines a second value at the (0,0) element of the second data unit according to the second quantized DC coefficient, generates a second VLC stream of the second data unit by encoding the determined second value and the second AC coefficients, generates the encoded bitstream further comprising the second VLC stream of the second data unit, and stores a second offset pointing to the beginning of the second VLC stream of the encoded bitstream in the random access table.

17. The system as claimed in claim 16 wherein the first value at the (0,0) element of the first data unit is the first quantized DC coefficient, and the second value at the (0,0) element of the second data unit is generated by subtracting the second quantized DC coefficient from a quantized DC coefficient or a quantized DC difference of the (0,0) element of the prior data unit.

18. The system as claimed in claim 17 wherein the image encoding unit further provides information indicating that insertion of restart mark for the first data unit is required, and provides information indicating that insertion of restart mark for the second data unit is not required.

19. The system as claimed in claim 18 wherein the image encoding unit determines whether insertion of restart mark for a data unit is required according to an insertion policy.

20. The system as claimed in claim 19 wherein the insertion policies instructs that a restart mark is inserted ahead of every data unit, a restart mark is inserted ahead of every minimum code unit (MCU), or a restart mark is inserted ahead of every certain number of MCUs, and each MCU contains at least Y, U and V data units.

21. A method for decoding a compression image comprising an encoded bitstream and a random access table, performed by an image decoding unit, comprising:
acquiring the random access table comprising a plurality of offsets from the compression image;
finding one offset corresponding to a portion of the encoded bitstream to be decoded;
decoding the encoded bitstream after the found offset;
displaying the decoding results,
wherein the decoding step further comprises:
acquiring a plurality of restart marks and a plurality of data units by decoding the portion of the encoded bitstream using entropy decoding and zero run-length decoding, each data unit comprising a value at the (0,0) element followed by a series of AC coefficients;
updating the value at the (0,0) element of one data unit when no restart mark is present ahead thereof; and
decoding each data unit by de-quantization and inverse discrete cosine transform (IDCT).

22. The method as claimed in claim 21 further comprising skipping a segment of the encoded bitstream corresponding to certain data units or minimum code units (MCUs) without restart marks ahead after the found offset.

23. The method as claimed in claim 21 wherein the value at the (0,0) element is updated by adding a value at the (0,0) element of a prior corresponding data unit thereto.

24. The method as claimed in claim 21 wherein the data unit is a Y, U or V data unit, Y represents luminance, U represents blue minus luminance, and V represents red minus luminance.

25. A system for decoding a compression image comprising an encoded bitstream and a random access table, comprising:
an image decoding unit acquiring the random access table comprising a plurality of offsets from the compression image, finding one offset corresponding to a portion of the encoded bitstream to be decoded, acquiring a plurality of restart marks and a plurality of data units by decoding the portion of the encoded bitstream using entropy decoding and zero run-length decoding, each data unit comprising a value at the (0,0) element followed by a series of AC coefficients, updating the value at the (0,0) element of one data unit when no restart mark is present ahead thereof, decoding each data unit by de-quantization and inverse discrete cosine transform (IDCT), and displaying the decoding results on a display.

26. The system as claimed in claim 25 wherein the image decoding unit further skips a segment of the encoded bitstream corresponding to certain data units or minimum code units (MCUs) without restart marks ahead after the found offset.

27. The system as claimed in claim 25 wherein the image decoding unit further updates the value at the (0,0) element by adding a value at the (0,0) element of a prior corresponding data unit thereto.

* * * * *